(No Model.)
J. H. EGAN.
Cone Attachment for Stoves.
No. 238,870. Patented March 15, 1881.
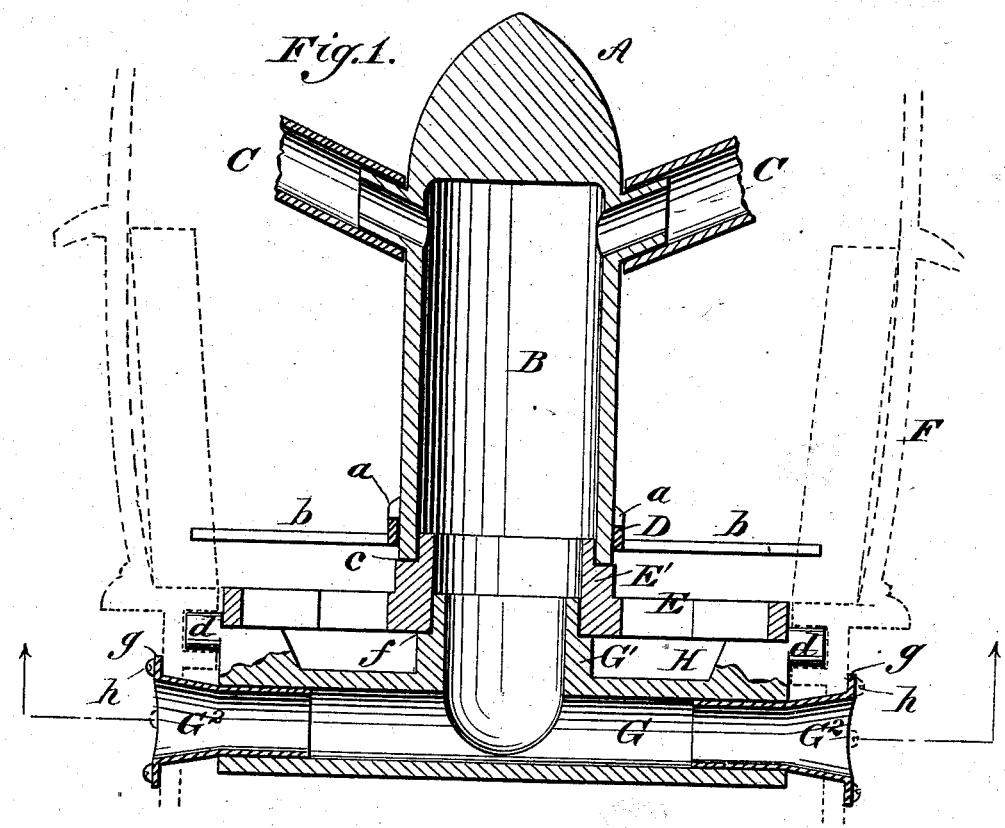
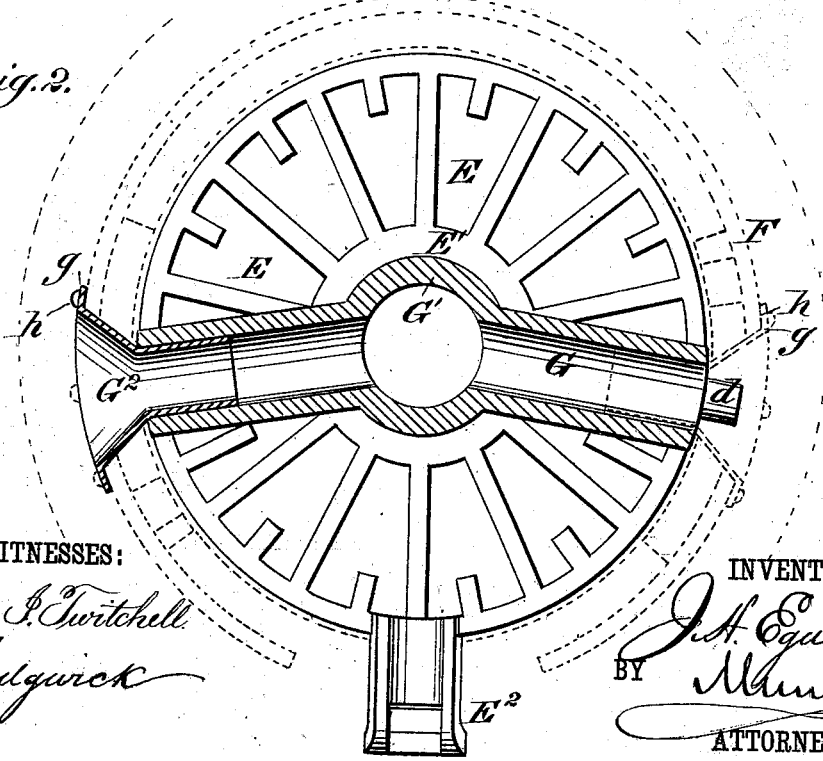
WITNESSES:
Donn I. Twitchell
C. Sedgwick
INVENTOR:
J. H. Egan
BY Munn & Co.
ATTORNEYS.
N. PETERS, PHOTO-LITHOGRAPHER, WASHINGTON, D.C.

UNITED STATES PATENT OFFICE.

JAMES H. EGAN, OF ST. JOHNSVILLE, NEW YORK.

CONE ATTACHMENT FOR STOVES.

SPECIFICATION forming part of Letters Patent No. 238,870, dated March 15, 1881.

Application filed January 15, 1881. (No model.)

*To all whom it may concern:*

Be it known that I, JAMES H. EGAN, of St. Johnsville, in the county of Montgomery and State of New York, have invented a new and useful Improvement in Cone Attachments for Stoves, of which the following is a full, clear, and exact description.

In using the cone attachments for stoves it is found that when the cone is heated the draft through it is so powerful as to draw in all or most of the air entering the ash-pit, and consequently the fire on the stove-grate surrounding the cone becomes nearly or quite extinguished for lack of air to support its combustion.

This invention is designed as an improvement on the cone attachment for which Letters Patent No. 229,684 were granted to me July 6, 1880, and its object is to overcome the difficulty above mentioned and to supply air to the cone without interfering with the draft through the grate.

Figure 1 is a vertical sectional elevation, showing the improved device in position in a stove. Fig. 2 is a transverse section of the same on line $x$ $x$, Fig. 1.

Similar letters of reference indicate corresponding parts.

In the drawings, A represents the cone attachment, having a vertical central hollow space, B, of equal diameter throughout, and reaching about two-thirds the height upward of the said cone.

C C are radial tubular projections communicating with the space B at about the top thereof. The said cone attachment A is provided about its bottom with several lugs, $a$ $a$, resting upon a ring, D, from which radial arms $b$ $b$ project, and are secured in the lining or side of said stove F, as indicated. The said cone A is thereby held sufficiently above the grate E to permit the free movement of the latter for cleaning.

The grate E is provided with a central opening, from which an annular flange, E', projects upward into the bottom of the cone A, said flange E' being provided with a shoulder, $e$, that fits closely up against the lower rim of said cone A, thereby making a close joint and preventing the entrance of dust and ashes into said cone A from the fire-place.

$E^2$ is the lip by which the grate E is shaken. G represents the tubular grate-supporting bar, the former of which is provided on either end with projecting lugs $d$ $d$, that enter the sides of the stove F, and thereby hold said bar G and grate E in place. Said grate-supporting bar G is provided with a central vertical tubular projection, G', of a size to fit into the central opening of the grate E, and provided with a shoulder, $f$, for said grate E to rest upon, thereby making a close joint with said grate E, so that no dust or ashes shall enter the cone attachment A from the ash-pit H. This tubular projection G' communicates with the interior of the tubular bar G, so that air entering the open ends of said bar G shall pass into the cone A. The ends of this tubular grate-supporting bar G are prolonged outside of the sides of the stove F by funnels $G^2$, that are fastened by their flanges $g$ to the outside of the said stove F by rivets $h$, as shown. These funnels $G^2$ are so fitted into the ends of the bar G that the latter can be easily turned without disturbing the former.

I do not confine myself to the precise construction of this tubular grate-supporting bar G, as herein shown and described, as it may be made in one piece or in several sections, as may be most convenient; or air-conductors of other designs extending from the outside of the stove up through the grate into the cone may be used without departing from my invention. The internal diameter of the said bar G should be sufficient to supply the cone A with a full volume of air.

It will be seen that when this device is applied to a cone attachment for stoves the cone will be supplied with air exclusively from outside the stove, and that the fire on the grate will have the advantage of all the air entering the ash-pit.

I am aware that it is not new to extend a tube under the lower part of stove and connect it with the central tube of the stove for the passage of air; but

What I claim as new is—

1. In cone attachments, the combination of the lugs *a* on tube B, the ring D, having arms *b*, and the flange or shoulder E′ on the grate, as shown and described.

2. The combination, with the tubular grate-supporting bar G, provided with vertical tubular projection G′, of the grate E, provided with vertical central annular flange, E′, substantially as and for the purpose described, the said projection G′ supporting the grate and preventing the entrance of dust and ashes from the ash-pit up through the annular flange E′, as set forth.

JAMES HENRY EGAN.

Witnesses:
J. H. MACKELL,
J. M. HUBBARD.